US010338844B2

(12) United States Patent
Sunaga

(10) Patent No.: US 10,338,844 B2
(45) Date of Patent: Jul. 2, 2019

(54) STORAGE CONTROL APPARATUS, CONTROL METHOD, AND NON-TRANSITORY COMPUTER-READABLE STORAGE MEDIUM

(71) Applicant: FUJITSU LIMITED, Kawasaki-shi, Kanagawa (JP)

(72) Inventor: Kazuyuki Sunaga, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 15/249,635

(22) Filed: Aug. 29, 2016

(65) Prior Publication Data

US 2017/0068457 A1 Mar. 9, 2017

(30) Foreign Application Priority Data

Sep. 7, 2015 (JP) .................. 2015-176057

(51) Int. Cl.
*G06F 13/00* (2006.01)
*G06F 3/06* (2006.01)

(52) U.S. Cl.
CPC ............ *G06F 3/065* (2013.01); *G06F 3/0619* (2013.01); *G06F 3/0689* (2013.01)

(58) Field of Classification Search
CPC ....... G06F 3/065; G06F 3/0619; G06F 3/0689
See application file for complete search history.

(56) References Cited

U.S. PATENT DOCUMENTS

2004/0230863 A1* 11/2004 Buchhorn ........... G06F 11/1446
714/6.12
2009/0055697 A1 2/2009 Radke et al.
2010/0058011 A1* 3/2010 Satoyama ........... G06F 11/1458
711/162

FOREIGN PATENT DOCUMENTS

JP 5-74059 3/1993
JP 2010-537314 12/2010
JP 2014-059821 4/2014

* cited by examiner

*Primary Examiner* — Charles Rones
*Assistant Examiner* — Han V Doan
(74) *Attorney, Agent, or Firm* — Fujitsu Patent Center

(57) ABSTRACT

A storage control apparatus including a memory that stores information that indicates an amount of data that have been written to a storage device, the storage device being coupled to a backup storage device for the storage device, and a processor coupled to the memory and the processor configured to determine an execution period of a verification process to verify a performance of the backup storage device based on the information stored in the memory and a total data capacity written to the storage device in a guarantee period of the storage device.

9 Claims, 11 Drawing Sheets

FIG. 5

| TBW THRESHOLD VALUE | WRITE DATA AMOUNT THRESHOLD VALUE [PB] | PATROL PERIOD | CONTENTS OF PATROL PROCESS | |
|---|---|---|---|---|
| - | - | - | START UP HOT SPARE, EXECUTE WHOLE VERIFICATION PROCESS ONLY AT TIME OF INITIAL POWER-ON, AND SUSPEND OPERATION OF HOT SPARE | 501-1 |
| 0.3 | 0.9 | ONCE EVERY MONTH | START UP HOT SPARE, EXECUTE WHOLE VERIFICATION PROCESS, AND SUSPEND OPERATION OF HOT SPARE | 501-2 |
| 0.6 | 1.8 | ONCE EVERY WEEK | START UP HOT SPARE, EXECUTE WHOLE VERIFICATION PROCESS, AND SUSPEND OPERATION OF HOT SPARE | 501-3 |
| 0.9 | 2.7 | EVERY SECOND | AFTER STARTUP OF HOT SPARE, CONSECUTIVELY PERFORM VERIFY CMD FOR SMALL SECTOR EVERY SECOND WITH HOT SPARE NOT SUSPENDED | 501-4 |

411

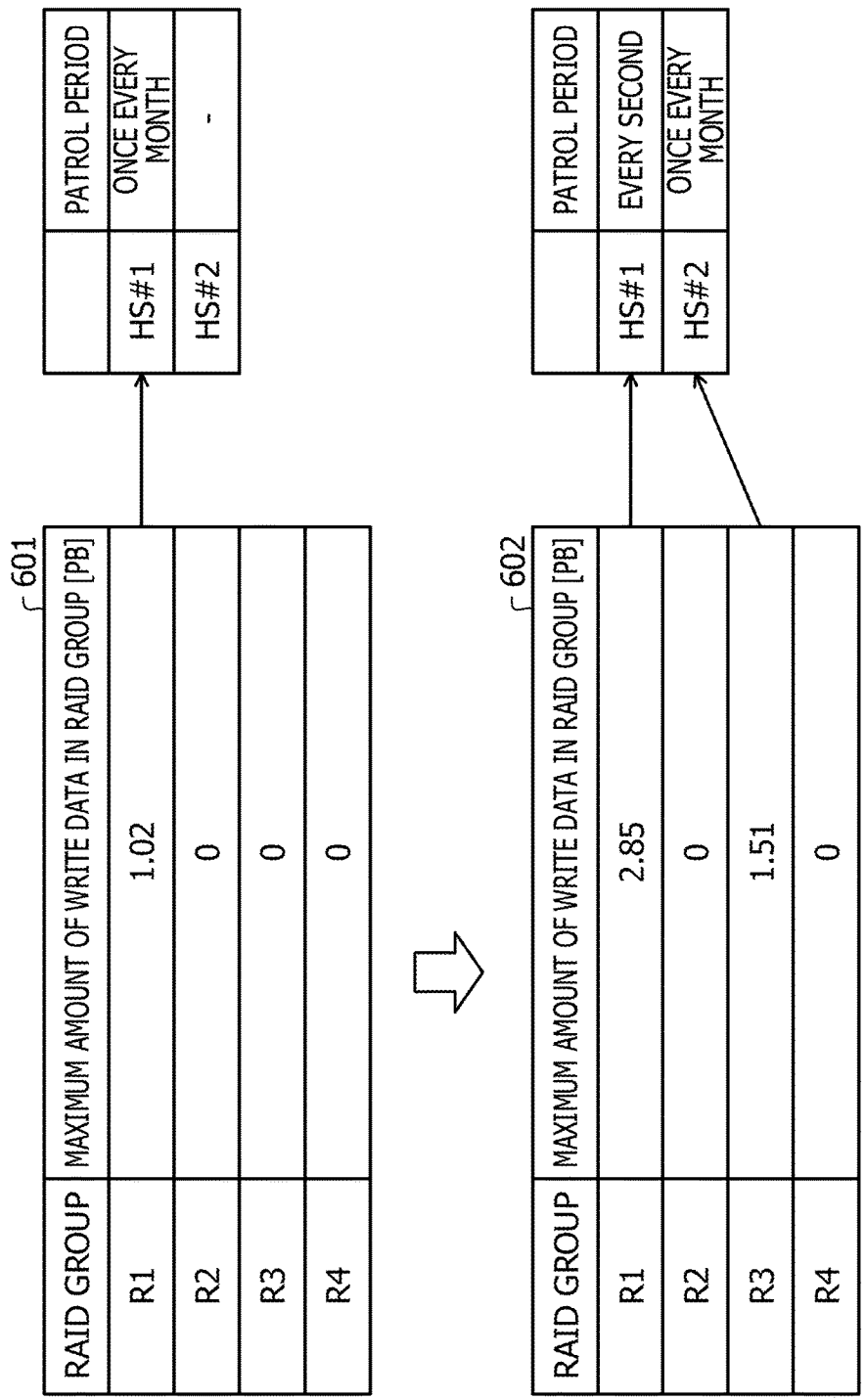

STORAGE CONTROL APPARATUS, CONTROL METHOD, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2015-176057, filed on Sep. 7, 2015, the entire contents of which are incorporated herein by reference.

FIELD

The embodiment discussed herein relates to a storage control apparatus, a control method, and a non-transitory computer-readable storage medium.

BACKGROUND

In a related art technique, a backup storage device for a storage device is configured to be on standby in an operative state, and if the storage device malfunctions, the backup storage device is used instead of the storage device. In another related art technique, a verification process is periodically performed to verify whether the backup storage device is in a normal function state and thus to guarantee the reliability of the backup storage device.

In yet another related art technique, a central processing unit (CPU) counts the number of accesses to a memory block. If the number of accesses exceeds a predetermined value, the CPU reduces the number of memory patrols, each of which is periodically performed to detect an error of the memory block and to correct the error. In another related art technique, if a condition, based on at least one of an access count to a cell of a flash memory device, and an amount of time that has elapsed since storage of information on the flash memory device is satisfied, a scan operation is performed to detect an error in the information stored on the flash memory device. In another related art technique, depending on the frequency of occurrence of an input and output operation related to a command through a channel during a past fixed period of time determined by a diagnosis control timer and a diagnosis control counter, a determination as to whether a read diagnosis of a disk device is enabled is performed, and the number of read target tracks is determined. The read diagnosis is thus performed during an idle time period in the input and output operation.

The related art techniques are disclosed in Japanese Laid-open Patent Publication Nos. 2014-059821, 5-74059, and Japanese National Publication of International Patent Application No. 2010-537314.

SUMMARY

According to an aspect of the invention, an storage control apparatus including a memory that stores information that indicates an amount of data that have been written to a storage device, the storage device being coupled to a backup storage device for the storage device, and a processor coupled to the memory and the processor configured to determine an execution period of a verification process to verify a performance of the backup storage device based on the information stored in the memory and a total data capacity written to the storage device in a guarantee period of the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of storage contents of a hot-spare patrol period threshold value management table;

FIG. 6 illustrates an example of a patrol period of hot spares in the storage system that includes multiple redundant arrays of inexpensive disks (RAID);

DESCRIPTION OF EMBODIMENTS

In accordance with the related art techniques, however, it is difficult to minimize a workload for the verification process of the backup storage device with the reliability of the backup storage device for the storage device maintained. For example, if the execution period of the verification process is shortened, the possibility that the backup storage device malfunctions with the storage device also malfunctioning is low. In such a case, the reliability of the backup storage device is maintained but the workload for the verification process of the backup storage device increases. On the other hand, if the execution period of the verification process is lengthened, the workload for the verification process of the backup storage device is lightened, but the possibility that the backup storage device malfunctions with the storage device also malfunctioning is high. As a result, the reliability is the backup storage device decreases.

In one aspect, an embodiment provides a storage control apparatus, a control method, and a control program to minimize the workload for the verification process of the backup storage device with the reliability of the backup storage device for the storage device maintained.

The storage control apparatus, the control method, and the control program are described below as the embodiment with reference to the drawings.

Figure 1:
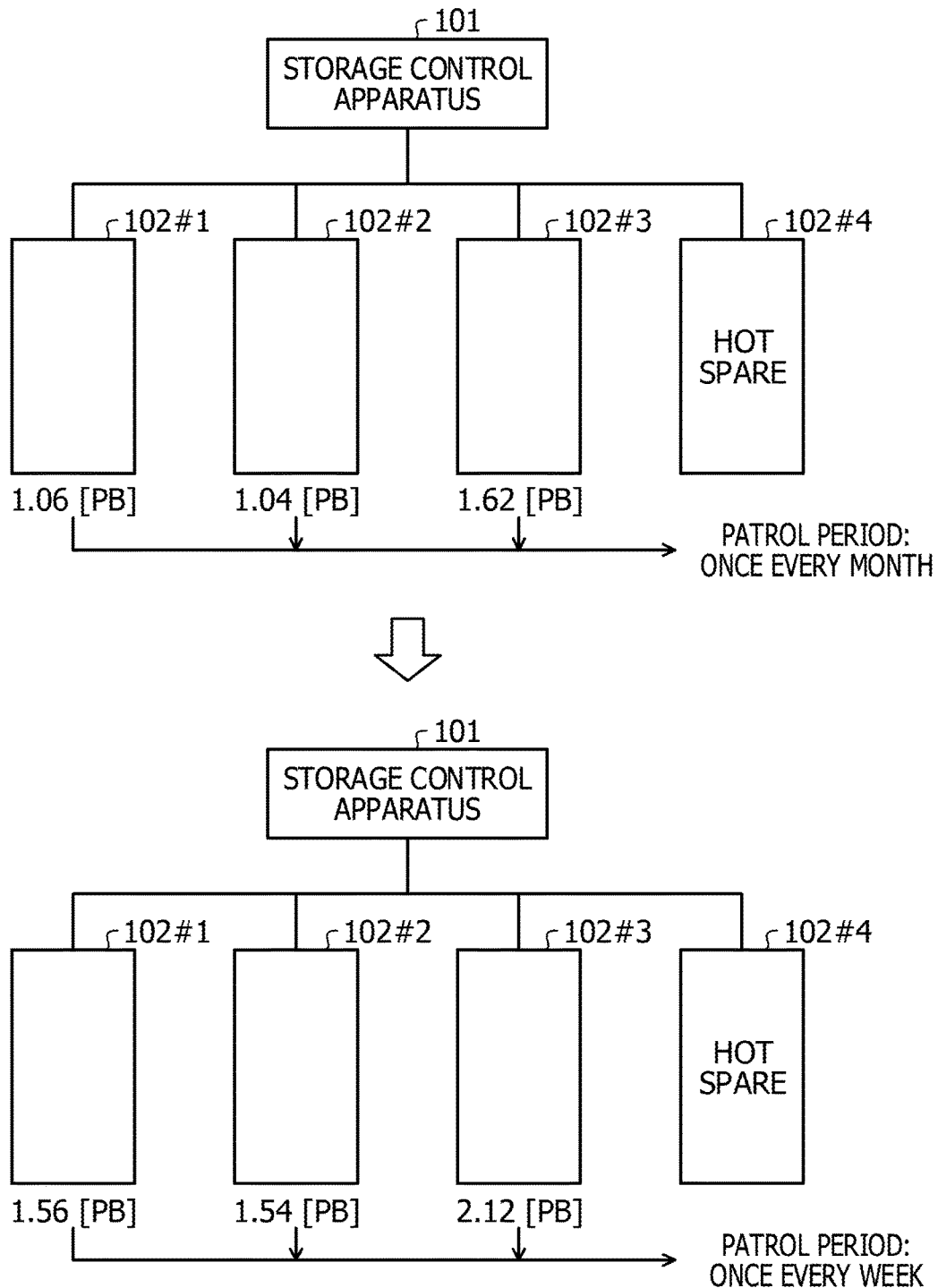
FIG. 1 illustrates an operation example of a storage control apparatus of an embodiment.

FIG. 1 illustrates an operation example of a storage control apparatus 101 of an embodiment. The storage control apparatus 101 is a computer that controls multiple storage devices 102#1 through 102#3, each having a flash memory as a storage medium, and a storage device 102#4. For example, i the storage control apparatus 101 organizes the storage devices 102#1 through 102#3 into a redundant array of inexpensive disks (RAID) group using RAID technique, and the storage device 102#4 is configured to be a backup storage device for the storage devices 102#1 through 102#3. The storage control apparatus 101 maintains the storage device 102#4 in a power-on standby state. If any of the storage devices 102#1 through 102#3 malfunctions, the storage device 102#4 is used instead of the malfunctioning storage device 102. The backup storage device is hereinafter referred to as a hot spare (HT).

The RAID technique uses multiple storage devices in combination as a virtual disk. The storage control apparatus 101 organizes storage devices belonging to an RAID group into a single virtual disk using the RAID technique. The RAID technique is defined by an RAID level that represents a formation method of the virtual disk. The RAID levels include RAID 0 through RAID 6. The RAID levels also include RAID 0+1, which is a combination of multiple RAID levels. The present embodiment is applicable to any RAID level. The user of the storage control apparatus 101 may use any logic volume by selecting and configuring a member drive, a member RAID group, a member RAID level, and logical capacity.

Each of the storage devices 102#1 through 102#3 includes a flash memory as a storage medium, namely, is a solid state drive (SSD). Specifically, the flash memory may be a NOR type flash memory or a NAND type flash memory. The flash memory includes an oxide film serving as an insulator that is degraded by electrons that penetrate each time a write operation is performed on the flash memory, and a write enable count is specified. The write enable count is an upper limit permitted on the number of write operations. The specifications of the flash memory include information related to total bytes written (TBW) that indicate an amount of data writable on the flash memory in accordance with the write enable count within the guarantee period of the flash memory. The storage device 102#4 may be a flash memory as a storage medium, or another storage device, such as a hard disk drive (HDD).

The storage control apparatus 101 periodically performs a verification process on the storage device 102#4 to determine whether the storage device 102#4 functions normally for the purpose of ensuring the integrity of the drive of the storage device 102#4. In the discussion that follows, the verification process is also referred to as a "patrol process". The execution period of the patrol process is referred to as a "patrol period". By periodically performing the patrol process on the hot spare, the reliability of the hot spare is maintained. The reliability of the hot spare refers to the possibility that the hot spare functions normally if the storage device 102 corresponding to the hot spare malfunctions.

The patrol process is periodically performed on the hot spare because there is a possibility that the hot spare may also malfunction when the storage device 102 corresponding to the hot spare malfunctions. If the hot spare is an HDD, a possible cause for the malfunction of the HDD may be mechanical failure in a driving system thereof. If the hot spare is an SSD, the SSD is typically lower in failure rate than the HDD because no mechanical failure occurs in the SSD. Although the failure rate of the SSD is low, the SSD may be determined to be faulty if the SSD remains unable to reply to the host during a monitoring time period of the host and shifts into a time-out state. Some SSDs include a capacitor that stores power to guarantee data writing during a power interrupt. The SSD may malfunction because of failure in that capacitor, though the failure rate due to this cause is still low.

In a specific example of the patrol process, the storage control apparatus 101 issues a read command or a verify command to the storage device 102#4. The storage control apparatus 101 may now issue a read command to the storage device 102#4. Upon receiving the read command, the storage device 102#4 reads data from the flash memory serving as a storage medium, and then transmits information indicating whether the data has been normally read and transmits the read data to the storage control apparatus 101. The storage control apparatus 101 may now transmit a verify command to the storage device 102#4. Upon receiving the verify command, the storage device 102#4 reads data from the flash memory serving as a storage medium, and then transmits to the storage control apparatus 101 information indicating whether the data has been normally read. Regardless of whether the read command or the verify command has been transmitted, the storage control apparatus 101 verifies the normal operation of the storage device 102#4 when the information indicating that the data has been correctly read.

The use of the verify command reduces the workload on a bus that connects the storage control apparatus 101 to the storage device 102#4 more than the use of the read command because the read data is not transferred in the use of the verify command.

It is difficult to reduce the workload involved in the patrol process of the hot spare with the reliability of the hot spare maintained. For example, if the patrol period is shortened, the possibility that the hot spare malfunctions with the storage device 102 malfunctioning decreases. The reliability of the hot spare is maintained while the workload involved in the patrol process of the hot spare increases. If the patrol period is lengthened, on the other hand, the workload involved in the patrol process of the hot spare is reduced while the possibility that the hot spare malfunctions with the storage device 102 malfunctioning increases. The reliability of the hot spare decreases.

If a malfunction is detected in the patrol process of the hot spare, the storage control apparatus 101 determines that the hot spare malfunctions, and isolates the hot spare. But the hot spare malfunctions though the user does not use a function of the hot spare related to the malfunction. This inconveniences the user. If a read command and a verify command may be repeatedly executed on an SSD serving as the hot spare, a read operation is repeated, leading to a bit error, namely read disturb. Overuse of the read command and the verify command leads to rapid degradation of the hot spare.

The embodiment described below is related to a method of determining the patrol period of the hot spare in accordance with an amount of write data and TBW of each of the storage devices 102#1 through 102#3. As illustrated in FIG. 1, the operation example of the storage control apparatus 101 is described. Referring to FIG. 1, each of the storage devices 102#1 through 102#3 has 3.0 peta bytes (PB).

In the upper portion of FIG. 1, the storage control apparatus 101 acquires an amount of write data from each of the storage devices 102#1 through 102#3, and stores the amount of write data onto an accessible memory. In the upper portion of FIG. 1, the storage control apparatus 101 acquires 1.06 PB, 1.04 PB, and 1.62 PB respectively from the storage devices 102#1 through 102#3. The storage control apparatus 101 stores the acquired amounts of data of the storage devices 102#1 through 102#3 onto the memory.

Based on the amount of data of the storage devices 102#1 through 102#3 and TBW of the storage device 102, the storage control apparatus 101 determines the patrol period of the storage device 102#4 serving as the hot spare. For example, the storage control apparatus 101 identifies 1.62 PB as a maximum amount of data from the amounts of data of the storage devices 102#1 through 102#3 in the upper portion of FIG. 1. The storage control apparatus 101 determines the patrol period of the storage device 102#4 serving as the hot spare to be once a month corresponding to 1.62 PB.

The storage control apparatus 101 may determine the patrol period of the hot spare by referencing a table that associates the amount of write data with the patrol period. For example, a threshold value of the amount of write data may be listed in the table. The storage control apparatus 101 then references the table. If the amount of write data is below the threshold value, the storage control apparatus 101 determines the patrol period of the hot spare to be a lower frequency of occurrence, namely, a longer period. If the amount of write data is above the threshold, the storage control apparatus 101 determines the patrol period of the hot spare to be a higher frequency of occurrence, namely, a shorter period. The operation example of using the table is described with reference to FIG. 5.

Alternatively, in advance, the administrator of the storage control apparatus 101 may determine the patrol period when the amount of write data is zero, and the patrol period when the amount of write data is TBW. The storage control apparatus 101 may also determine the patrol process of the hot spare through linear interpolation that is based on a maximum amount of write data, the patrol period with the amount of write data being zero and the patrol period with the amount of write data being TBW. For example, the patrol period may be once every 9 hours when the amount of write data is zero, and the patrol period may be once every hour when the amount of write data is TBW. If the amount of write data is half the value of TBW, the storage control apparatus 101 determines the patrol process of the hot spare to be an intermediate value, namely, once every 5 hours.

The lower portion of FIG. 1 illustrates an increase in each of the amounts of write data of the storage devices 102#1 through 102#3 after the elapse of a considerable amount of time from the state illustrated in the upper portion of FIG. 1. In the lower portion of FIG. 1, the storage control apparatus 101 acquires 1.56 PB, 1.54 PB, and 2.12 PB respectively as amounts of write data from the storage devices 102#1 through 102#3. The storage control apparatus 101 stores the acquired amounts of write data of the storage devices 102#1 through 102#3 on the memory.

The storage control apparatus 101 determines the patrol period, based on the amounts of write data of the storage devices 102#1 through 102#3 and TBW of the storage device 102. In the lower portion of FIG. 1, the storage control apparatus 101 identifies 2.12 PB as a maximum amount of write data from among the amounts of write data of the storage devices 102#1 through 102#3. The storage control apparatus 101 determines the patrol period of the storage device 102#4 to be once a week corresponding to 2.12 PB.

The storage control apparatus 101 performs the patrol process on the storage device 102#4 having become the hot spare with the patrol period responsive to the amount of write data suggesting how often the storage devices 102#1 through 102#3 may malfunction. The storage control apparatus 101 thus maintains the reliability of the storage device 102#4 while reducing the workload on the patrol process of the storage device 102#4. If the storage device 102#4 is an SSD, the read operations to the flash memory are reduced, degradation of the storage device 102#4 is controlled, and service life of the storage device 102#4 is increased.

In the upper portion of FIG. 1, the possibility of malfunction of the storage devices 102#1 through 102#3 is relatively low. By lengthening the patrol period, the workload for the patrol process of the storage device 102#4 is reduced. In the lower portion of FIG. 1, the possibility of malfunction of the storage device 102#3 increases. By shortening the patrol period, the reliability of the storage device 102#4 is maintained.

Figure 2:
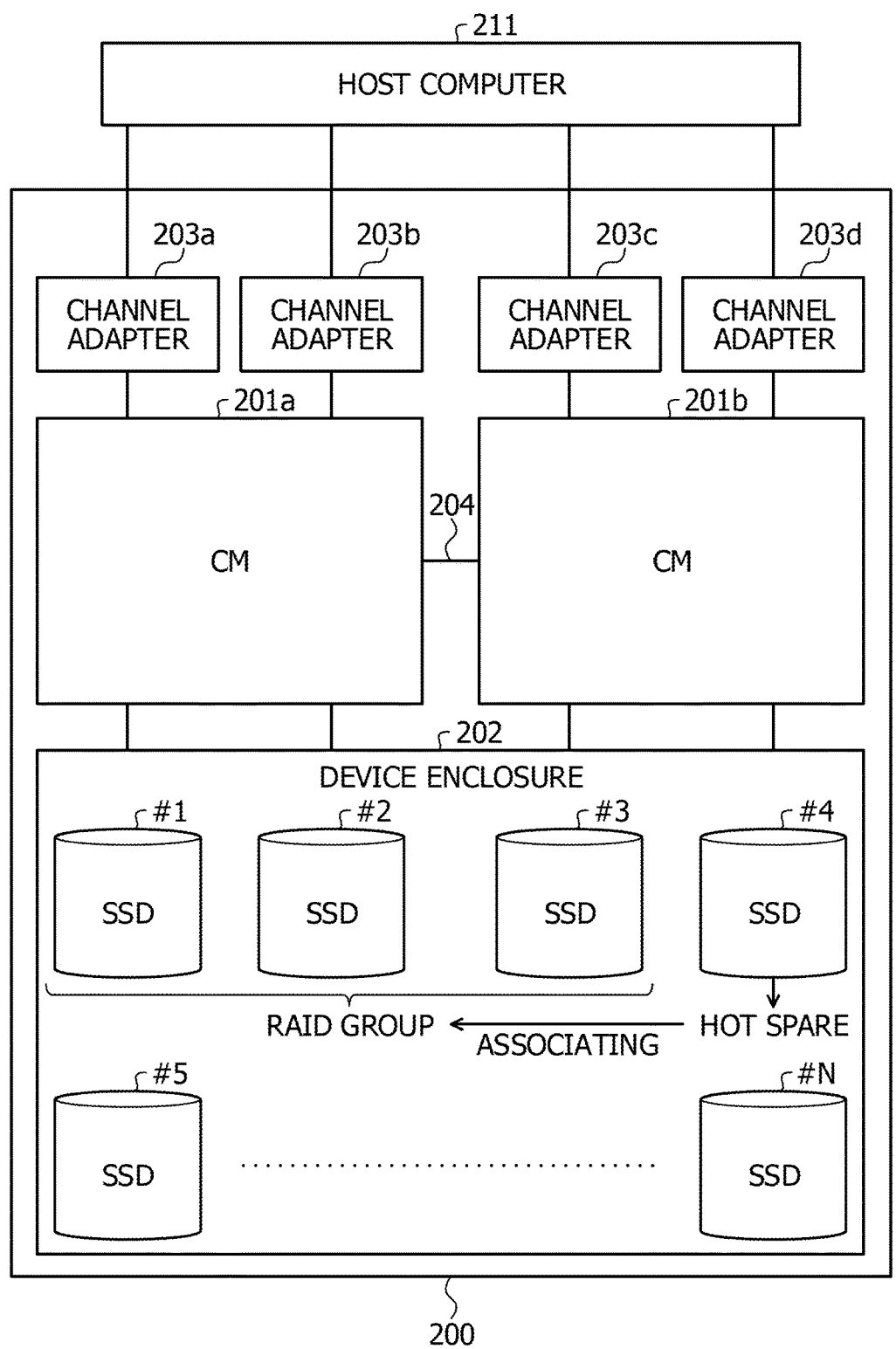
FIG. 2 illustrates a configuration of a storage system.

Referring to FIG. 1, the storage control apparatus 101 organizes the storage devices 102#1 through 102#3 into the RAID group. The embodiment is not limited to this arrangement. For example, the present embodiment is applicable to the case in which a single storage device 102 corresponds to a single hot spare. With reference to FIG. 1, the patrol period of the hot spare is determined. The present embodiment is not limited to this arrangement. For example, the storage control apparatus 101 may determine an execution count as to how many times the patrol process is performed on the hot spare within a predetermined time period. With reference to FIG. 2, the storage control apparatus 101 is applied as a control apparatus in a storage system.

FIG. 2 illustrates the configuration of a storage system 200. The storage system 200 includes control module CM 201a, and CM 201b, channel adaptors 203a through 203d that perform connection control on the CM 201a and CM 201b to a host computer 211, and a device enclosure 202. The CM 201a and CM 201b of FIG. 2 correspond to the storage control apparatus 101 of FIG. 1.

The storage system 200 receives data from and outputs data to multiple internal memory devices. The storage system 200 has an RAID function of RAID 1 through 6, organizes multiple storage devices into RAIDs, and thus manages each RAID as a single memory device.

The CM 201a and CM 201b generally control the storage system 200. The CM 201a is connected to the CM 201b via a bus 204. The CM 201a and CM 201b communicate control information and data therebetween via the bus 204.

The host computer 211 performs a job process, and is connected to the storage system 200 via a storage area network (SAN) including a fiber channel for data communication. The host computer 211 stores or reads data for use in the job process from or to the storage system 200.

The device enclosure 202 includes SSD#1 through SSD#N corresponding to the storage device 102 of FIG. 1 and other multiple storage devices (not illustrated). Multiple storage devices in the device enclosure 202 form an RAID group. The RAID group is a logical memory region that is based on the RAID technique. For the simplicity of explanation, the following discussion is based on the premise that the RAID group RAID 5 includes SSD#1 through SSD#3, and that SSD#4 is a hot spare for the RAID group including the SSD#1 through SSD#3. The SSD#1 through SSD#3 correspond to the storage devices 102#1 through 102#3 of FIG. 1. The SSD#4 corresponds to the storage device 102#4 of FIG. 1. Any of the SSD#1 through SSD#N that is neither included in the RAID group nor configured to be a hot spare is permissible.

The SSD#1 through SSD#N may be configured to be an RAID. Another storage device in the device enclosure 202 may be a storage medium including a flash memory other than SSD. The other storage device in the device enclosure 202 may be a storage device that is a non-volatile semiconductor memory other than the flash memory. For example, the other storage device may be an electrically erasable programmable read-only memory (EEPROM). The other storage device in the device enclosure 202 may be a hard disk drive (HDD) that stores data on a magnetic recording medium.

The channel adaptors 203a through 203d perform connection control between the host computer 211 and each of the CM 201a and CM 201b. For example, upon receiving a request from the host computer 211, the channel adaptor 203a performs connection control between the host computer 211 and the CM 201a. Each of the CM 201a and CM 201b is configured to be connected to multiple channel adaptors 203a through 203d (each CM is connected to two channel adaptors in FIG. 2). More specifically, the CM 201a is connected to two different the channel adaptors 203a and 203b to ensure redundancy.

The channel adaptors 203a through 203d are connected to the host computer 211 for communication through the SAN including a fiber channel. Alternatively, a connection system other than the fiber channel may be used. The communication between the channel adaptors 203a through 203d and the host computer 211 may be established using an exclusive line or a virtual private network (VPN) such that the storage system 200 may be installed at a remote location from the host computer 211.

Referring to FIG. 2, the two control modules CM 201a and CM 201b are used, and two of the channel adaptors 203a through 203d are respectively connected to the CM 201a and CM 201b. Any number of channel adaptors to be connected to the channel adaptor is acceptable. A single device enclosure 202 is used as illustrated in FIG. 2. Any number of device enclosures is acceptable.

Figure 3:
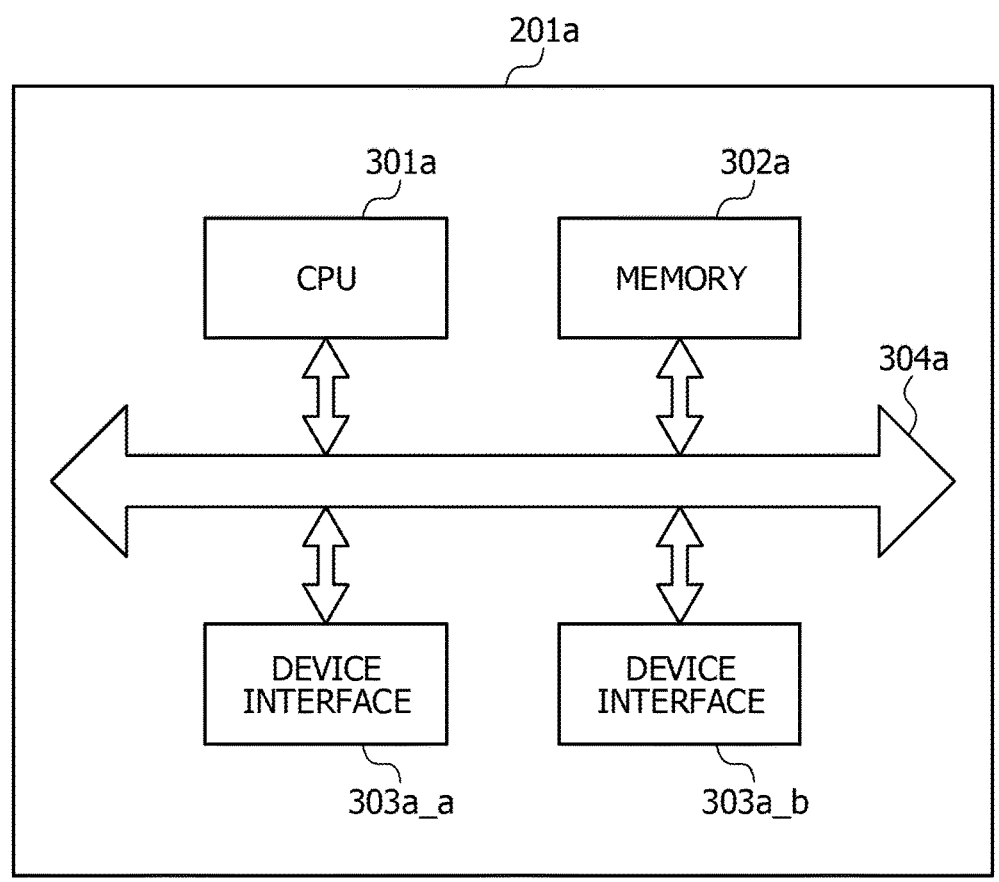
FIG. 3 is a block diagram illustrating a hardware configuration of a controller module.

FIG. 3 is a block diagram illustrating the hardware configuration of the CM 201a. The CM 201a includes a CPU 301a, a memory 302a, and device interfaces 303a_a and 303a_b. The CPU 301a, the memory 302a, and the device interfaces 303a_a and 303a_b are interconnected via a bus 304a.

The CPU 301a performs a variety of control processes thereof in accordance with an operating system (OS). The CM 201a manages resources, such as the memory 302a, SSD#1 through SSD#4 and other storage devices in the device enclosure 202, and the channel adaptors 203a through 203d.

The memory 302a stores control data that is used when the CPU 301a controls the storage system 200. The memory 302a temporarily stores input and output data that is read from or written on each storage device in the device enclosure 202.

The device interfaces 303a_a and 303a_b perform connection control on each storage device in the device enclosure 202. The CM 201a and CM 201b operate as control devices, and are detachably mounted on the storage system 200. The CM 201b is identical in configuration to the CM 201a, and the discussion thereof is omitted herein.

Functional Configuration of CM 201

Figure 4:
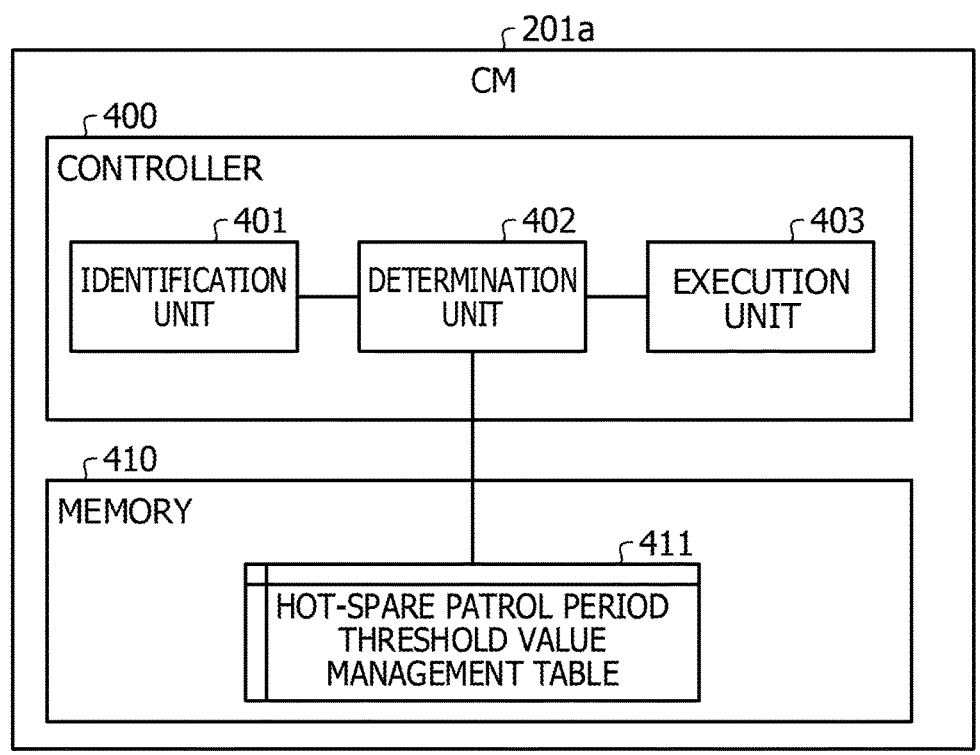
FIG. 4 is a block diagram illustrating a functional configuration of the controller module.

FIG. 4 is a block diagram illustrating the functional configuration of the controller module CM 201a. The CM 201a includes a controller 400 and a memory 410. The controller 400 includes an identification unit 401, a determination unit 402, and an execution unit 403. The controller 400 implements the function of each element in the CM 201a when the CPU 301a performs a program stored on a memory device. The memory device is specifically the memory 302a of FIG. 3, or one of the SSD#1 through SSD#N. The process results of each element are stored on the register of the CPU 301a, the cache memory of the CPU 301a, the memory 302a, or the like.

The CM 201a may access a hot-spare patrol period threshold value management table 411. The hot-spare patrol period threshold value management table 411 stores period information indicating the execution period of the verification process responsive to a predetermined ratio to the storable data capacity. The predetermined ratio to the storable data capacity is a ratio to a threshold value of the amount of write data at which the patrol period responsive to TBW is changed. The predetermined ratio to the storable data capacity is from zero or higher to 1 or lower. For example, the predetermined ratio may be 0.3 or 0.6. Information listed in the hot-spare patrol period threshold value management table 411 is stored on a storage device, such as the memory 302a as the memory 410. FIG. 5 illustrates an example of storage contents of the hot-spare patrol period threshold value management table 411.

The memory 410 may store data indicating the amount of write data on each SSD acquired from each SSD in the RAID group. The memory 410 stores the data indicating the amount of write data on one of the SSD#1 through SSD#N acquired from the one of the SSD#1 through SSD#N.

The determination unit 402 determines the patrol period of the hot spare in accordance with the amount of write data and TBW of each of SSDs in the RAID group. For example, the determination unit 402 determines the patrol period of the hot spare in accordance with the method described with reference to FIG. 1.

If the SSDs in the RAID group are equal in the value of TBW, the determination unit 402 determines a ratio of a maximum amount of write data from among the amounts of write data on the SSDs to the value of TBW. The determination unit 402 may determine the patrol period responsive to the determined ratio to be the patrol period of the hot spare. If the SSDs are different in the value of TBW in the RAID group, the determination unit 402 determines the ratio of the amount of write data on each SSD to the value TBW. The determination unit 402 may determine the patrol period responsive to the maximum ratio to be the patrol period of the hot spare.

The determination unit 402 may determine the period of the verification process to the hot spare in accordance with the amount of write data on each storage device by referencing the hot-spare patrol period threshold value management table 411.

The determination unit 402 may determine whether to cause the hot spare to suspend the operation thereof after the verification process to the hot spare, in accordance with the amount of write data and TBW on each SSD in the RAID group.

The execution unit 403 performs the patrol process on the hot spare in accordance with the patrol period determined by the determination unit 402. The execution unit 403 does not perform the patrol process on an SSD that is not the hot spare and does not belong to the RAID group, from among the SSD#1 through SSD#N.

Two or more hot spares may be present for multiple RAID groups. In such a case, the identification unit 401 identifies a maximum amount of write data in each RAID group by referencing the amounts of data on the SSDs in each of the RAID groups. The determination unit 402 references the hot-spare patrol period threshold value management table 411, and successively determines the patrol period responsive to the maximum amount of data of each of the identified RAID groups in the order of period length from a shorter period to a longer period to be the patrol period of each hot spare. A specific example of the determination operation is described with reference to FIG. 6.

FIG. 5 illustrates an example of storage contents of the hot-spare patrol period threshold value management table 411. The hot-spare patrol period threshold value management table 411 manages the patrol period responsive to the amount of write data and patrol process contents. The hot-spare patrol period threshold value management table 411 of FIG. 5 lists records 501-1 through 501-4.

The hot-spare patrol period threshold value management table 411 includes fields for a TBW threshold value, a write data amount threshold value, a patrol period, and patrol process contents. The TBW threshold value field lists a predetermined ratio that serves as a threshold value to change the patrol period with TBW being 1. The write data amount threshold value field lists a threshold value of an amount of write data at which the patrol period and the patrol process contents, calculated based on the TBW threshold value, change. The patrol period field lists a period with which the patrol process is performed on the hot spare when the amount of write data of the SSD exceeds the write data amount threshold value. The patrol process content field lists data indicating the contents of the patrol process of the hot spare when the amount of write data exceeds the write data amount threshold value.

The hot-spare patrol period threshold value management table 411 of FIG. 5 indicates that the TBW of the SSD is 3 PB. For example, the record 501-1 indicates that the patrol process is not periodically performed on the hot spare if the amount of write data on the SSD is 0.9 PB or less. The contents of the patrol process of the hot spare in the record 501-1 indicate that the hot spare is started up, the whole verification process is performed at the first power-on operation, and then the operation of the hot spare is then suspended.

The record 501-2 indicates the patrol process is performed on the hot spare once every month if the amount of write data on the SSD falls within a range of more than 0.9 PB but less than or equal to 1.8. The contents of the patrol process of the hot spare in the record 501-2 indicate that the hot spare is started up, the whole verification process is performed, and then the operation of the hot spare is then suspended.

The record 501-3 indicates that the patrol process is performed on the hot spare once every week if the amount of write data on the SSD falls within a range of more than 1.8 PB but less than or equal to 2.7 PB. The contents of the patrol process of the hot spare in the record 501-3 indicate that the hot spare is started up, the whole verification process is performed, and then the operation of the hot spare is suspended.

The record 501-4 indicates that the patrol process is performed on the hot spare every second if the amount of write data on the SSD above 2.7 PB. The contents of the patrol process of the hot spare in the record 501-4 indicate that once the hot spare is started up, the verify command (CMD) is successively performed over a small sector every second, and the hot spare remains operating.

Referring to FIG. 5, the possibility of malfunction of the SSD is lower if the amount of write data on the SSD does not exceed 2.7 PB. The patrol process of the hot spare includes suspending the operation of the hot spare. In contrast, if the amount of write data on the SSD exceeds 2.7 PB, the possibility of malfunction of the SSD is higher, and the patrol process of the hot spare does not include suspending the operation of the hot spare.

If multiple RAID groups correspond to multiple hot spares, the patrol period of the hot spare is determined as described with reference to FIG. 6.

FIG. 6 illustrates an example of the patrol period of the hot spares in the storage system 200 that includes multiple RAID groups. In the example of FIG. 6, the storage system 200 includes four RAID groups R1 through R4. Two hot spares HS#1 and #2 may now be configured for RAID groups R1 through R4.

For convenience of explanation, each of the RAID groups R1 through R4 are simply designated R1 through R4, respectively. Also for convenience of explanation in FIG. 6, TBW of each of the SSD included in the RAID groups R1 through R4 is 3 PB. Note that the SSDs in the RAID groups may be different in TBW. In such a case, the CM 201a stores the hot-spare patrol period threshold value management table 411 responsive to each RAID group.

A table 601 of FIG. 6 lists a maximum amount of write data in each of the RAID groups R1 through R4. More specifically, the table 601 lists 1.02 PB for a maximum amount of write data in R1 and zero for a maximum amount of write data in each of R2 through R4.

The CM 201a successively determines the patrol period responsive to the maximum amount of write data in each of the RAID groups in the order of period length from a shorter patrol period to a longer patrol period to be the patrol period of each of the two or more hot spares. In the table 601, for example, the maximum amounts of write data of the RAID groups are 1.02 PB and 0 PB in the order of magnitude from a larger amount to a smaller amount. The patrol periods are once every month, and the process not periodically performed in the order of period length from a shorter period to a longer period by referencing the hot-spare patrol period threshold value management table 411 of FIG. 5. The CM 201a thus determines the patrol period of the hot spare HS#1 to be the shortest patrol period, namely, once every month, and the patrol period of the hot spare HS#2 to be non-periodic.

A table 602 lists the maximum amount of write data in each of the RAID groups R1 through R4 in a state after the elapse of a predetermined period of time from the state of the table 601. More specifically, the table 602 lists 2.85 PB for the maximum amount of write data in R1, 1.51 PB for the maximum amount of write data in R3, and 0 PB for the maximum amounts of write data in R2 and R4.

In the table 602, the maximum amounts of write data of the RAID groups are 2.85 PB, 1.51 PB, and 0 PB in the order of magnitude from a larger amount to a smaller amount. The patrol periods are every second, once every month, and non-periodic in the order of period length from a shorter period to a longer period by referencing the hot-spare patrol period threshold value management table 411 illustrated in FIG. 5. The CM 201a thus determines every second as the shortest patrol period to be the patrol period of the hot spare HS#1, and once every month as the next shorter patrol period to be the patrol period of the hot spare HS#2.

The process performed by the CM 201a is described with reference to flowcharts of FIG. 7 through FIG. 11.

Figure 7:
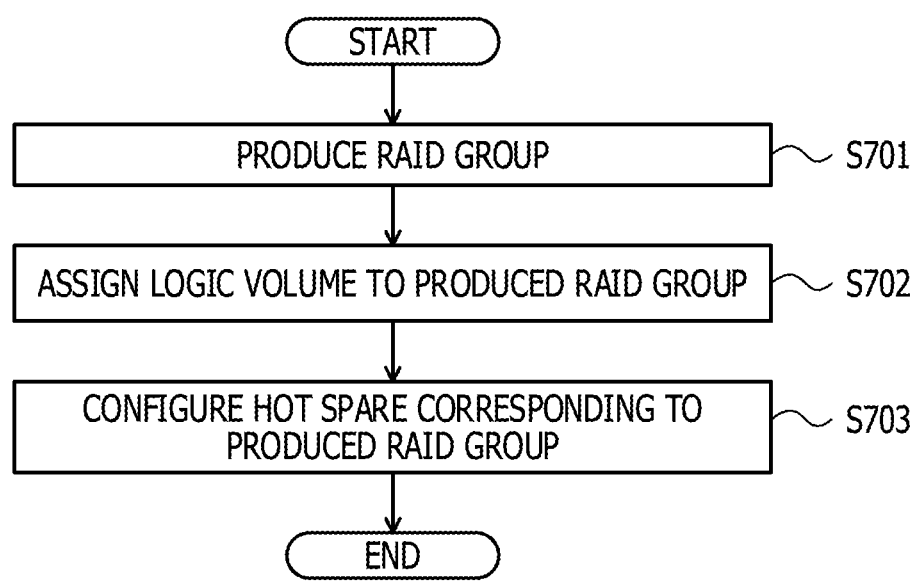
FIG. 7 is a flowchart illustrating an example of a hot-spare configuration process.

FIG. 7 is a flowchart illustrating an example of a hot-spare configuration process. The hot-spare configuration process is to configure a hot spare for an RAID group. The hot-spare configuration process is performed when an RAID group is organized.

The CM 201a produces an RAID group from some of the SSD#1 through SSD#N (step S701). The CM 201a then assigns a logic volume to the produced RAID group (step S702). The CM 201a configures a hot spare for the produced RAID group (step S703). The CM 201a ends the hot-spare configuration process subsequent to the end of step S703. By performing the hot-spot configuration process, the CM 201a increases the reliability of the produced RAID group.

Figure 8:
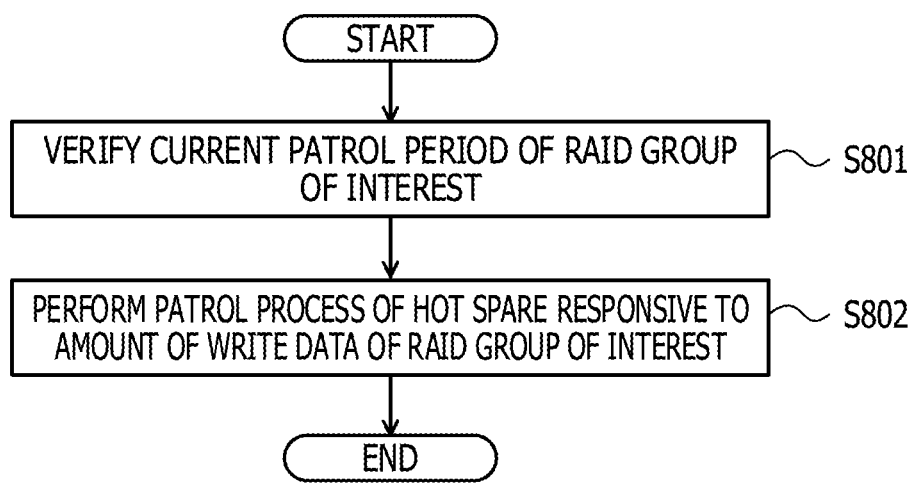
FIG. 8 is a flowchart illustrating an example of a patrol process of the hot spare.

FIG. 8 is a flowchart illustrating an example of a patrol process of the hot spare. The hot-spare patrol process is performed to verify the integrity of the hot spare. The hot-spare patrol process is performed with the determined patrol period.

The CM 201a checks the current patrol period of the RAID group of interest (step S801). The CM 201a performs the patrol process of the hot spare responsive to the amount of write data of the RAID group of interest (step S802). The CM 201a ends the patrol process of the hot spare subsequent to the end of step S802. By performing the patrol process, the CM 201a performs the patrol process to the hot spare with the period responsive to the amount of write data.

Figure 9:
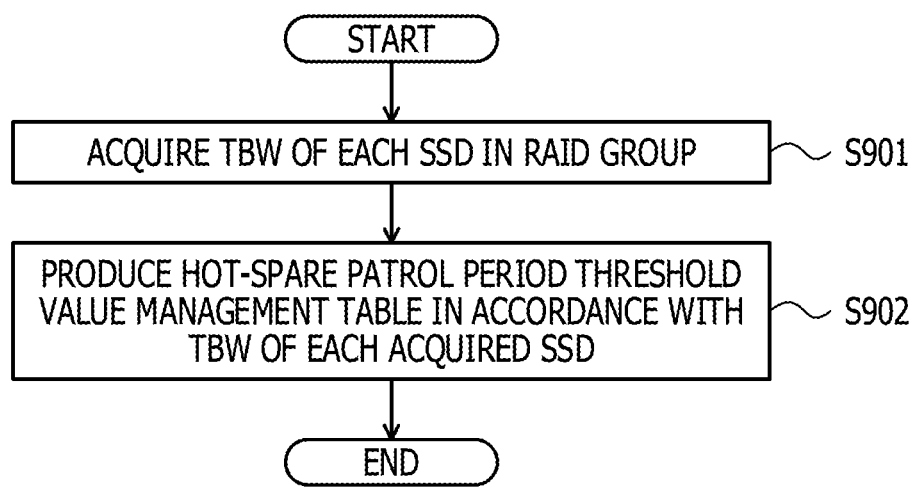
FIG. 9 is a flowchart illustrating an example of a configuration process of the hot-spare patrol period threshold value.

FIG. 9 is a flowchart illustrating an example of a configuration process of the hot-spare patrol period threshold value. The configuration process of the hot-spare patrol period threshold value produces the hot-spare patrol period threshold value management table 411 and then configures a write data amount threshold value.

The CM 201a acquires TBW of each SSD in the RAID group (step S901). The CM 201a produces the hot-spare patrol period threshold value management table 411 in accordance with the acquired TBW of each SSD (step S902).

Specifically, the CM 201a stores the hot-spare patrol period threshold value management table 411 having an empty cell at the write data amount threshold value field out of the fields of the hot-spare patrol period threshold value management table 411. The CM 201a stores, onto the write data amount threshold value field of each record, a product of the acquired TBW and the TBW threshold value at the record of the hot-spare patrol period threshold value management table 411. For example, if the acquired TBW is 3 PB in the record 501-2, the CM 201a stores 0.3×3=0.9 PB in the write data amount threshold value field of the record 501-2.

Subsequent to step S902, the CM 201a ends the hot-spare patrol period configuration process. By performing the hot-spare patrol period configuration process, the CM 201a configures a write data amount threshold value responsive to the TBW of the SSD.

Figure 10:
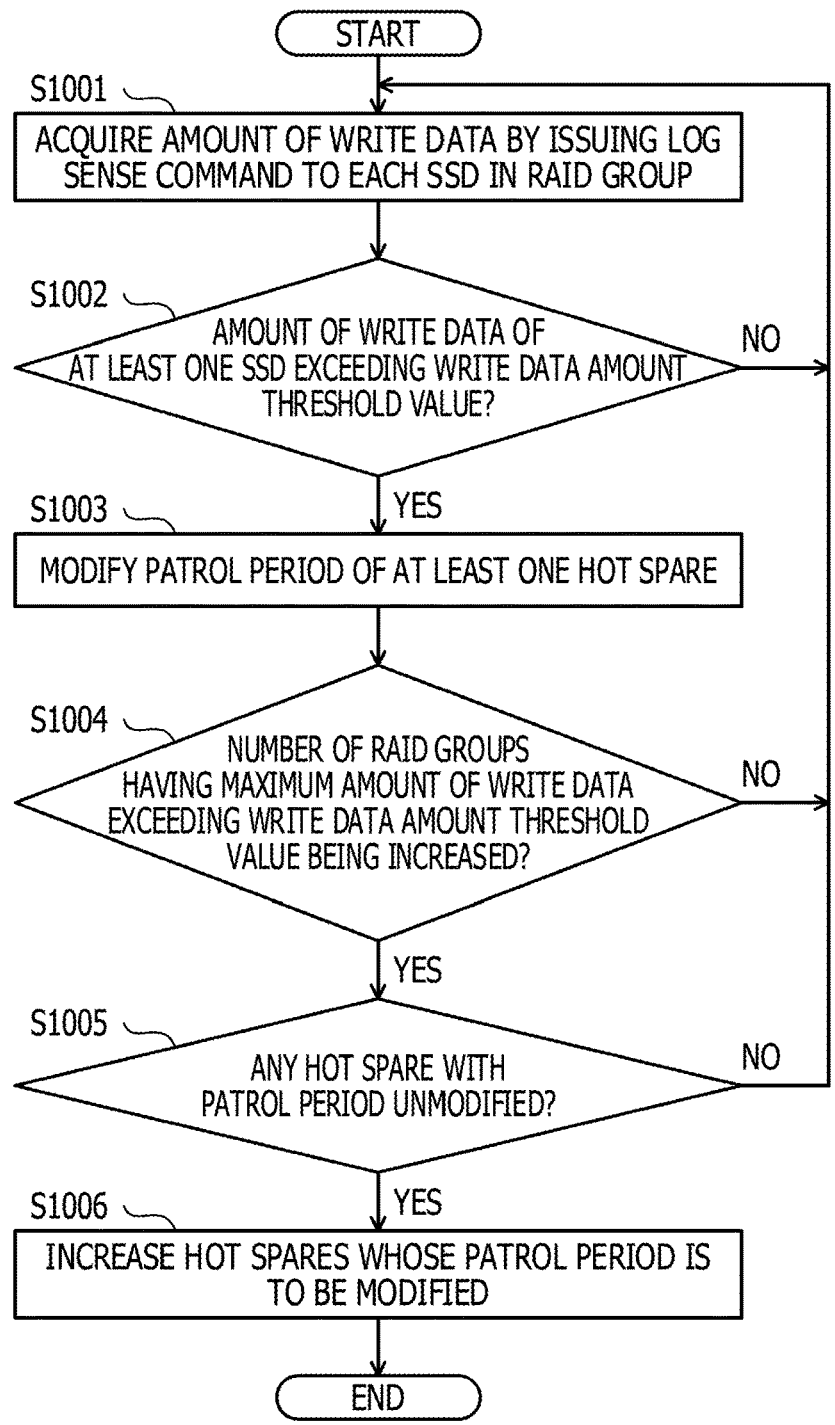
FIG. 10 is a flowchart illustrating an example of a write data amount threshold value excess determination process.

FIG. 10 is a flowchart illustrating an example of a write data amount threshold value excess determination process. The write data amount threshold value excess determination process is performed to determine whether the write data amount threshold value is exceeded or not. The write data amount threshold value excess determination process is performed periodically.

The CM 201a issues a log sense command to each SSD in the RAID group to acquire an amount of write data (step S1001). The CM 201a then determines whether the amount of write data exceeds the write data amount threshold value at least on one SSD (step S1002). If the amount of write data does not exceed the write data amount threshold value on any of the SSDs (no branch from step S1002), the CM 201a returns to step S1001. If the amount of write data exceeds the write data amount threshold value at least on one SSD (yes branch from step S1002), the CM 201a modifies the patrol period of at least one hot spare (step S1003).

In step S1003, the CM 201a may modify the patrol periods of two or more hot spares. For example, in step S1002, the amounts of write data of the two or more hot spares in a specific RAID group may now exceed 2.7 PB as a write data amount threshold value, and two or more SSDs are configured to be the hot spares in the specific RAID group. In such a case, in step S1003, the CM 201a modifies to every second the patrol periods of the hot spares of the two SSDs from among the SSDs configured to be the hot spares in the specific RAID group.

The CM 201a determines whether the number of RAID groups with the maximum amount of write data exceeding the write data amount threshold value has increased or not (step S1004). If the number of RAID groups with the maximum amount of write data exceeding the write data amount threshold value has increased (yes branch from step S1004), the CM 201a determines whether there is any hot spare that has not modified the patrol period (step S1005).

If there is a hot spare whose patrol period is unmodified (yes branch from step S1005), the CM 201a increases the number of hot spares whose patrol period is to be modified (step S1006). It is assumed in step S1006 that there are four RAID groups and that two SSDs are configured to be hot spares for the four RAID groups. In this case, it is also assumed in step S1004 that the number of RAID groups with the maximum amount of write data exceeding the write data amount threshold value has increased from one to two. It is also assumed that one of the two hot spares has a patrol period of every second with the other of the two hot spares being once every week and that the patrol periods have not been modified. In step S1006, the CM 201a modifies the patrol period of the other of the two hot spares to every second. Subsequent to step S1006, the CM 201a ends the write data amount threshold value excess determination process.

If the number of RAID groups with the maximum amount of write data exceeding the write data amount threshold value has not increased (no branch from step S1004), or if there is not any hot spare whose patrol period is unmodified (no branch from step S1005), the CM 201a returns to step S1001. By performing the write data amount threshold value excess determination process, the CM 201a increases the reliability of the hot spares by shortening the patrol period when the possibility of malfunction of the SSD increases.

Figure 11:
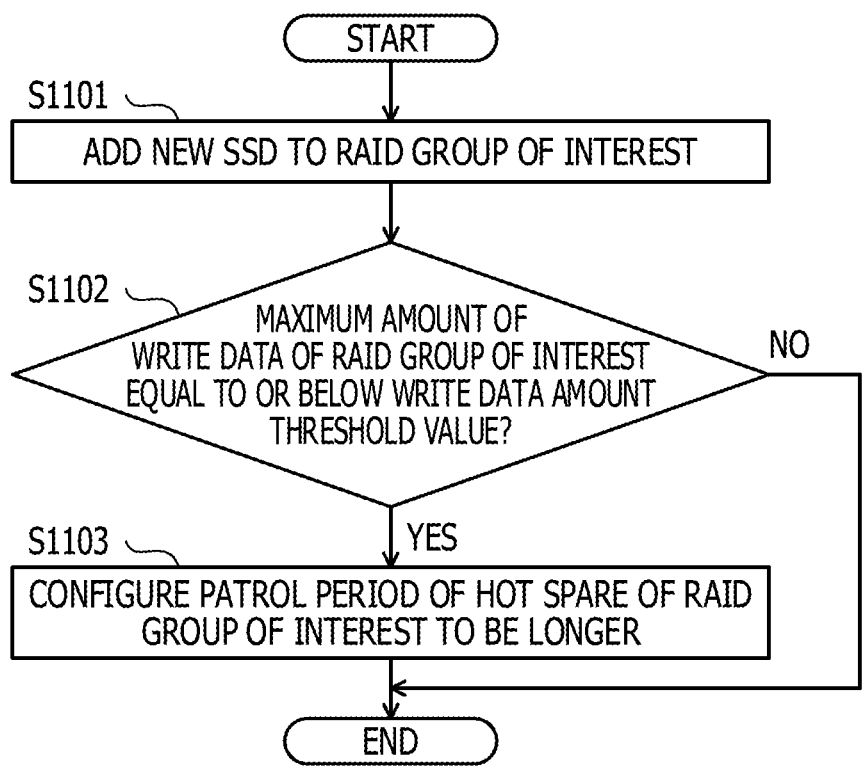
FIG. 11 is a flowchart illustrating an example of a solid state drive (SSD) addition process.

FIG. 11 is a flowchart illustrating an example of a solid state drive (SSD) addition process. The SSD addition process adds an SSD to the RAID group.

The CM 201a adds a new SSD to the RAID group of interest (step S1101). The CM 201a determines whether the maximum amount of write data is equal to or below the write data amount threshold value in the RAID group of interest (step S1102).

If the maximum amount of write data is equal to or below the write data amount threshold value in the RAID group of interest (yes branch from step S1102), the CM 201a configures the patrol period of the hot spare in the RAID group of interest to be longer (step S1103). In step S1102 and step S1103, a change of an SSD to another in a given RAID group with the write a data amount threshold value of 2.7 PB may now decrease the maximum amount of write data from 2.8 PB to 1.9 PB. In such a case, the CM 201a changes the patrol period of the hot spare in a given RAID group from every second to once every week.

Subsequent to step S1103, or if the maximum amount of write data is higher than the write data amount threshold value in the RAID group of interest (no branch from step S1102), the CM 201a ends the SSD addition process. If the possibility of malfunction is decreased by performing the SSD addition process, the CM 201a lengthens the patrol period of the hot spare and may thus increase the life of the hot spare.

As described above, the CM 201*a* determines the execution period of the patrol period of the hot spare corresponding to the SSD, based on the amount of write data and TBW of a given SSD. The CM 201*a* may maintain the reliability of the hot spare and reduce the workload involved in the patrol process of the hot spare.

The CM 201*a* may determine the patrol period of the hot spare corresponding to the RAID group, based on the amount of write data and TBW of each SSD in the RAID group. In this way, the CM 201*a* determines the execution period of the patrol process of the hot spare corresponding to the RAID group with respect to an SSD having the highest possibility of malfunction in the RAID group.

The CM 201*a* may determine the patrol period of the hot spare by referencing the hot-spare patrol period threshold value management table 411. In this way, the CM 201*a* may configure the patrol period of the hot spare more freely than when the patrol period is configured through linear interpolation. As illustrated in FIG. 5, for example, if the maximum amount of write data is lower than TBW×0.3, the CM 201*a* does not configure the patrol period. If the maximum amount of write data becomes TBW×0.9 or more, the CM 201*a* configures the patrol period to be every second.

The CM 201*a* may determine whether to suspend the operation of the hot spare corresponding to the RAID group, based on the amount of write data and TBW of each SSD in the RAID group. More specifically, if the amount of write data is smaller, the possibility of using the hot spare is lower. By suspending the operation of the hot spare subsequent to the completion of the patrol process, power consumption of the hot spare is thus reduced. If the amount of write data is larger, the possibility of using the hot spare is higher. By keeping the hot spare to continuously operate in the power-on state subsequent to the completion of the patrol process, the hot spare may be immediately used when the SSD malfunctions. Time for recovery is thus shortened.

There may be two or more hot spares corresponding to multiple RAID groups. In such a case, the CM 201*a* references the hot-spare patrol period threshold value management table 411, and successively determines each of the periods responsive to the maximum amounts of write data in each of the RAID groups in the order of period length from a shorter period to a longer period to be the patrol period of each hot spare. In this way, the CM 201*a* successively determines the period responsive to a peak amount of write data from among the maximum amounts of data in each of the RAID groups to be each of the patrol periods of the hot spares. The workload involved in the patrol process of the hot spare is thus reduced.

The hot spare may be an SSD. In this way, the creation of read disturb in the SSD having become the hot spare is controlled. The time period until the SSD having become the hot spare is lengthened, and the life of the SSD is lengthened.

The SSD having become the hot spare may still malfunction even though the possibility of malfunction is low. The SSD is thus desired to be effectively diagnosed at a minimum access frequency during a slow-business time band. In accordance with the embodiment, a malfunction of the hot spare may be detected by performing the patrol process at a minimum frequency of occurrence even if the amount of write data on each SSD in the RAID group is smaller.

A control method described in the embodiment may be implemented by executing a prepared control program on a personal computer, a workstation or the like. The control program may be recorded on a computer-readable recording medium, such as a hard disk, a flexible disk, a compact disk read-only memory (CD-ROM), or a digital versatile disk (DVD), and may be executed when the computer reads the control program from the recording medium. The control program may be distributed via a network, such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control apparatus comprising:
  a memory; and
  a processor coupled to the memory and the processor configured to:
    acquire, from each of a plurality of storage devices respectively having a flash memory, an amount of write data indicating a value of an amount of data stored in the flash memory,
    determine, based on a maximum value of the amounts of write data and an amount of writable data of the flash memory specified from a write enable count of the flash memory, an execution period of a verification process-for verifying whether a backup storage device which is to be used as a substitute of a storage device is failed or not, the execution period being determined so that the execution period becomes shorter as the maximum value becomes larger,
    execute the verification process in accordance with the determined execution period, and
    when amounts of new write data is acquired from the plurality of storage devices, again determine the execution period by using the acquired amounts of new write data,
  wherein the storage device is one of a plurality of storage devices included in a redundant array of inexpensive disks (RAID) group;
  wherein the memory stores information indicating the amount of data that have been written to each of the plurality of storage devices and acquired from each of the plurality of storage devices of the RAID group; and
  wherein the processor is configured to:
    determine the execution period of the verification process to the backup storage device for the RAID group based on the information stored on the memory and a total data capacity.

2. The storage control apparatus according to claim 1, wherein the processor is configured to:
  determine the execution period to execute the verification process based on the information indicating the amount of data that have been written to each of the storage devices and based on period information that indicates the execution period of the verification process responsive to a predetermined ratio to the total data capacity.

3. The storage control apparatus according to claim 1, wherein the processor is configured to:
  determine whether to suspend an operation of the backup storage device subsequent to completion of the verification process to the backup storage device based on the amount of data and based on the total data capacity of each of the storage devices.

4. The storage control apparatus according to claim 2, wherein the processor is configured to:
identify a maximum amount of data of each of a plurality of RAID groups based on the amount of data on each of a plurality of storage devices included in each of the plurality of RAID groups, the plurality of RAID groups corresponding to a plurality of backup storage devices, and
successively determine the execution period of the verification process of each of the plurality of backup storage devices in an order of period length of a shorter period to a longer period responsive to the maximum amount of data in each of the plurality of RAID groups, the maximum amount of data of each of the plurality of RAID groups being identified by referring the period information indicating the execution period of the verification process responsive to the predetermined rate to the total data capacity.

5. The information processing apparatus according to claim 1, wherein the backup storage device comprises a flash memory as a storage medium.

6. The information processing apparatus according to claim 1, wherein the processor is configured to
determine the execution period of the verification process through linear interpolation that is based on the maximum value of the amounts of write data, an execution period of the verification process in case that the amount of write data being zero, and an execution period of the verification process in case that the amount of write data being the amount of writable data of the flash memory.

7. The information processing apparatus according to claim 1, wherein the amount of writable data of the flash memory is total bytes written (TBW).

8. A storage system comprising:
a storage device;
a backup storage device which is to be used as a substitute of the storage device; and
a storage control apparatus including:
a memory; and
a processor coupled to the memory and configured to:
determine, based on a maximum value of amounts of write data and an amount of writable data of a flash memory specified from a write enable count of the flash memory, an execution period of a verification process for verifying whether a backup storage device which is to be used as a substitute of the storage device is failed or not, the execution period being determined so that the execution period becomes shorter as the maximum value becomes larger,
execute the verification process in accordance with the determined execution period, and
when amounts of new write data is acquired from the plurality of storage devices, again determine the execution period by using the acquired amounts of new write data,
wherein the storage device is one of a plurality of storage devices included in a redundant array of inexpensive disks (RAID) group;
wherein the memory stores information indicating the amount of data that have been written to each of the plurality of storage devices and acquired from each of the plurality of storage devices of the RAID group; and
wherein the processor is configured to:
determine the execution period of the verification process to the backup storage device for the RAID group based on the information stored on the memory and a total data capacity.

9. A storage control method executed by a computer, the storage control method comprising:
acquiring, from each of a plurality of storage devices respectively having a flash memory, an amount of write data indicating a value of an amount of data stored in the flash memory;
determining, based on a maximum value of amounts of write data and an amount of writable data of the flash memory specified from a write enable count of the flash memory, an execution period of a verification process for verifying whether a backup storage device which is to be used as a substitute of a storage device is failed or not, the execution period being determined so that the execution period becomes shorter as the maximum value becomes larger; and
executing the verification process in accordance with the determined execution period, and
when amounts of new write data is acquired from the plurality of storage devices, again determining the execution period by using the acquired amounts of new write data,
wherein the storage device is one of a plurality of storage devices included in a redundant array of inexpensive disks (RAID) group;
wherein a memory stores information indicating the amount of data that have been written to each of the plurality of storage devices and acquired from each of the plurality of storage devices of the RAID group; and
wherein a processor determines the execution period of the verification process to the backup storage device for the RAID group based on the information stored on the memory and a total data capacity.

* * * * *